US012724361B2

(12) United States Patent
Wakayama

(10) Patent No.: US 12,724,361 B2
(45) Date of Patent: Sep. 1, 2026

(54) IMAGE FORMING APPARATUS

(71) Applicant: KYOCERA Document Solutions Inc., Osaka (JP)

(72) Inventor: Kei Wakayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/033,459

(22) Filed: Jan. 21, 2025

(65) Prior Publication Data

US 2025/0237974 A1 Jul. 24, 2025

(30) Foreign Application Priority Data

Jan. 24, 2024 (JP) ................................ 2024-008496

(51) Int. Cl.

*G03G 15/08* (2006.01)
*G03G 21/10* (2006.01)
*G03G 21/12* (2006.01)
*G03G 21/16* (2006.01)

(52) U.S. Cl.

CPC ....... *G03G 15/0875* (2013.01); *G03G 21/105* (2013.01); *G03G 21/12* (2013.01); *G03G 21/1633* (2013.01)

(58) Field of Classification Search

CPC ........... G03G 15/0865; G03G 15/0875; G03G 15/0877; G03G 15/0879; G03G 21/10; G03G 21/105; G03G 21/12; G03G 21/1633; G03G 2221/169

See application file for complete search history.

(56) References Cited

U.S. PATENT DOCUMENTS

| | | | | |
|---|---|---|---|---|
| 9,874,834 | B2 | 1/2018 | Inada | |
| 2007/0048009 | A1 * | 3/2007 | Izumi ................ | G03G 15/0886 399/119 |
| 2017/0097587 | A1 | 4/2017 | Inada | |

(Continued)

FOREIGN PATENT DOCUMENTS

| | | | |
|---|---|---|---|
| JP | 2007-065271 | A | 3/2007 |
| JP | 2017068211 | A | 4/2017 |

OTHER PUBLICATIONS

The extended European search report issued by the European Patent Office on May 12, 2025, which corresponds to European Patent Application No. 25152713.1-1001 and is related to U.S. Appl. No. 19/033,459.

*Primary Examiner* — Carla J Therrien
(74) *Attorney, Agent, or Firm* — Studebaker Brackett PLLC

(57) ABSTRACT

An image forming apparatus includes a cover and a toner container. The cover opens and closes a side surface of an apparatus main body. The toner container is detachably attached to an inside of the apparatus main body. The cover is turned between a close position and an open position where an angle between the side surface of the apparatus main body and the cover is acute. The toner container includes a replenishment vessel and a recovery vessel, and the replenishment vessel and the recovery vessel are arranged in an upper-and-lower direction. The toner container is turned between an attachment position and a detachment position inclined so as to be along the cover. The toner container arranged in the detachment position is detached along the cover arranged at the close position.

4 Claims, 12 Drawing Sheets

(56) References Cited

U.S. PATENT DOCUMENTS

| | | | | |
|---|---|---|---|---|
| 2017/0269539 | A1* | 9/2017 | Komiyama ........ | G03G 15/0879 |
| 2020/0319587 | A1* | 10/2020 | Sato ................... | G03G 21/1623 |
| 2021/0302906 | A1 | 9/2021 | Anzai et al. | |

* cited by examiner

IMAGE FORMING APPARATUS

INCORPORATION BY REFERENCE

This application is based on and claims the benefit of priority from Japanese patent application No. 2024-008496 filed on Jan. 24, 2024, which is incorporated by reference in its entirety.

BACKGROUND

The present disclosure relates to an image forming apparatus.

An image forming apparatus in which a toner cartridge is housed along a side surface of an apparatus main body is known. A cover is provided on the side surface of the apparatus main body to rotate around the rear end. By opening the cover, a toner cartridge attaching/detaching opening is opened, and the toner cartridge can be attached/detached (replaced).

However, in the image forming apparatus described above, it is necessary to open the cover 90 degrees or more with respect to the side surface of the apparatus main body when the toner cartridge is attached and detached. In order to open the cover, it is required to secure a large space on the side of the image forming apparatus. For example, the image forming apparatus cannot be installed in a place where the open space of the cover cannot be secured, such as a narrow office.

SUMMARY

An image forming apparatus according to the present disclosure includes a cover and a toner container. The cover opens and closes a side surface of an apparatus main body. The toner container is detachably attached to an inside of the apparatus main body. The cover is turned in a reciprocating manner between a close position standing upright along the side surface of the apparatus main body and an open position inclined outside the apparatus main body around a lower portion of the cover such that an angle between the side surface of the apparatus main body and the cover is acute. The toner container includes a replenishment vessel in which a toner to be replenishment is contained and a recovery vessel in which the toner to be disposed is contained, and the replenishment vessel and the recovery vessel are arranged in an upper-and-lower direction. The toner container is turned in a reciprocating manner between an attachment position standing upright inside the apparatus main body and a detachment position inclined outside the apparatus main body around a lower portion of the toner container so as to be along the cover. The toner container arranged in the detachment position is detached along the cover arranged at the close position.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
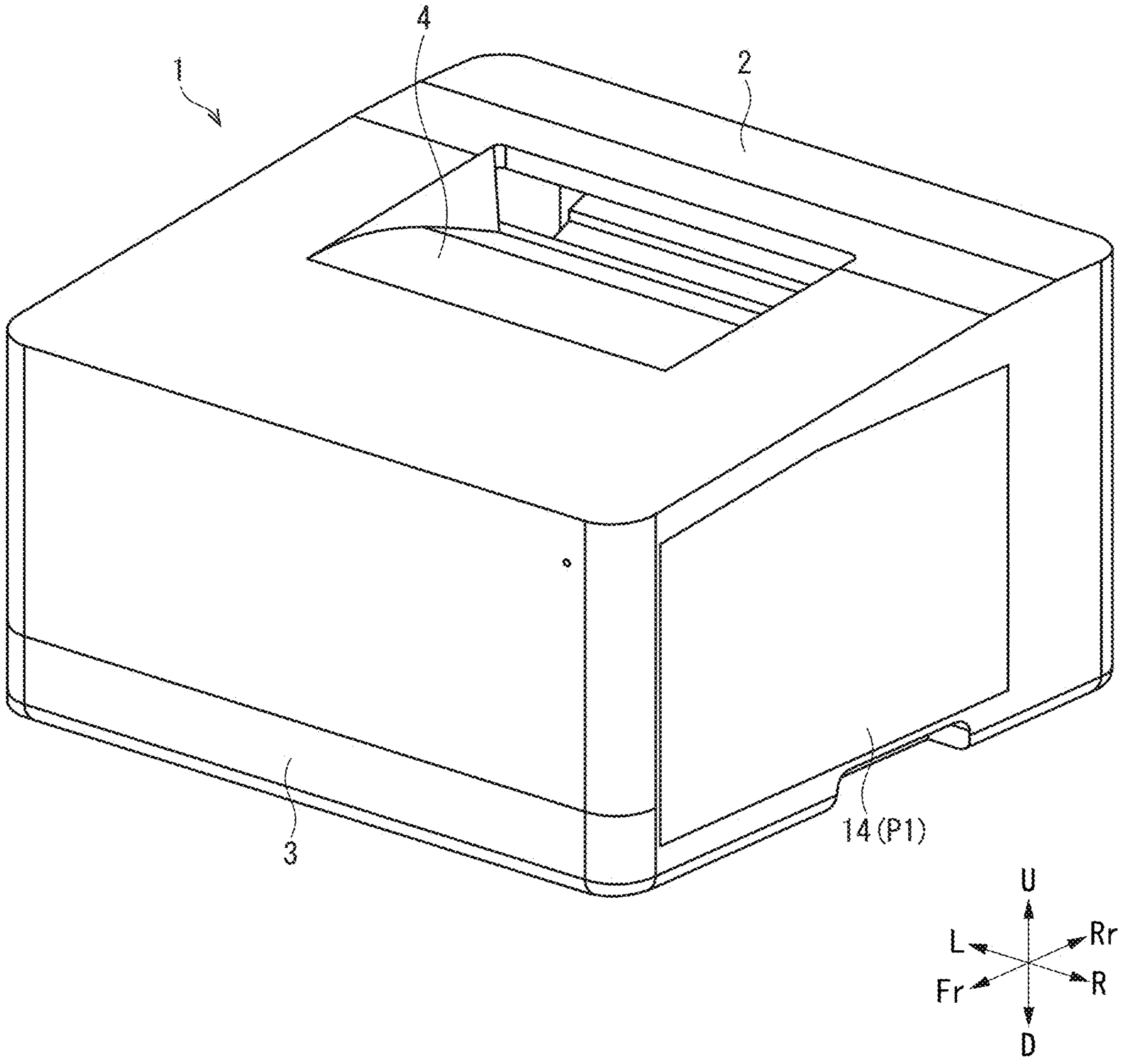
FIG. 1 is a perspective view showing an image forming apparatus according to one embodiment of the present disclosure.

With reference to the attached drawings, embodiments of the present invention will be described below. Fr, Rr, L, R, U and D shown in the drawings indicate the front, rear, left, right, upper and lower. Although terms showing direction and position are used herein, these terms are used for convenience of description and do not limit the technical scope of the present disclosure.

[Image forming apparatus] With reference to FIG. 1, the image forming apparatus 1 will be described. FIG. 1 is a schematic view (side view) showing an internal structure of the image forming apparatus 1.

Figure 2:
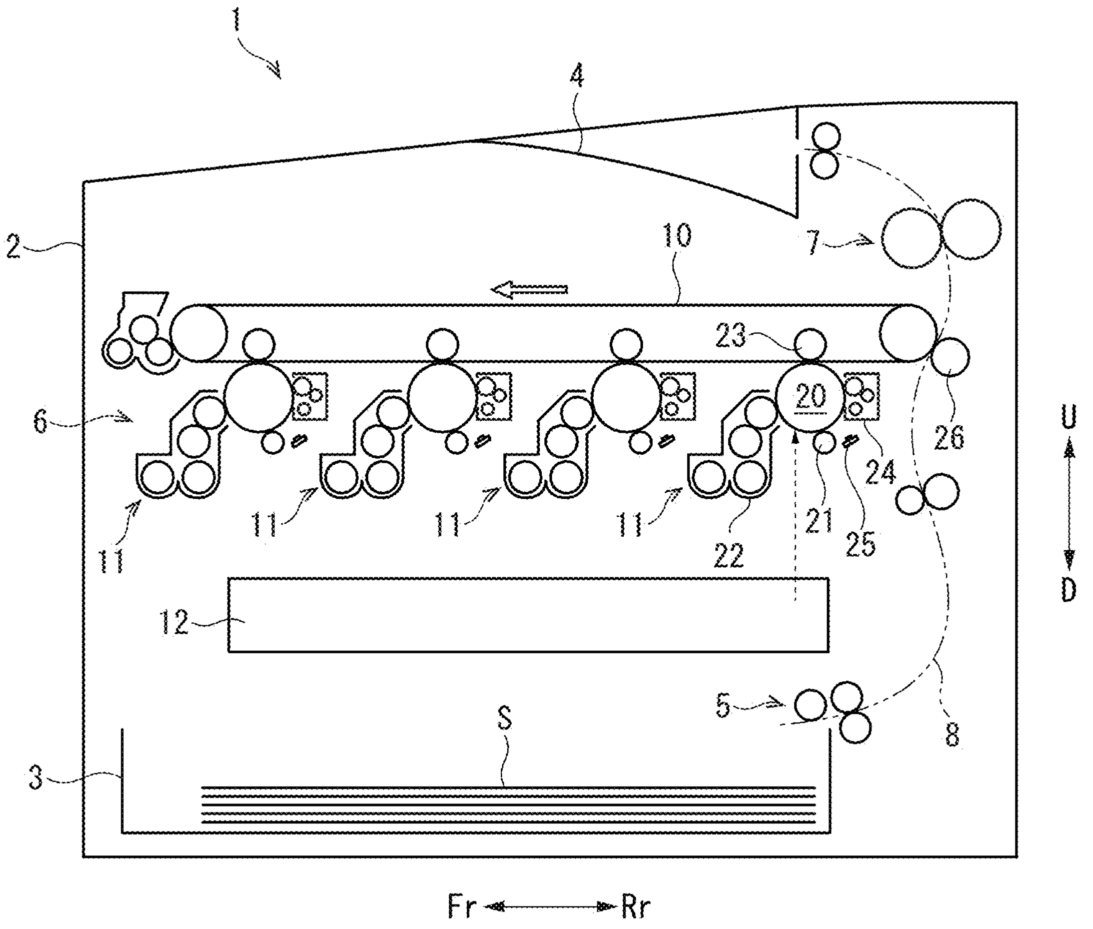
FIG. 2 is a schematic view (side view) showing an internal structure of the image forming apparatus according to the embodiment of the present invention.

The image forming apparatus 1 is a printer which forms an image on a sheet P by an electrophotographic method. As shown in FIG. 1 and FIG. 2, the image forming apparatus 1 includes an apparatus main body 2 constituting a substantially rectangular parallelepiped appearance. In the lower portion in the apparatus main body 2, a sheet feeding cassette 3 in which sheets P (medium) are stored is attached detachably. On the upper surface of the apparatus main body 2, a sheet discharge tray 4 on which the image-formed sheet P is received is provided. The sheet P is not limited to a paper sheet but may be made of resin or the like.

As shown in FIG. 2, a conveyance path 8 along which the sheet P is conveyed from the sheet feeding cassette 3 to the sheet discharge tray 4 is formed inside the apparatus main body 2. A sheet feeding device 5 is provided at the upstream end of the conveyance path 8, an image forming device 6 is provided at the midstream portion of the conveyance path 8, and a fixing device 7 is provided at the downstream portion of the conveyance path 8. The image forming device 6 includes an intermediate transfer belt 10, four image forming units 11, an exposing unit 12, and four toner containers (see FIG. 3 described later). Since the four image forming units 11 have almost the same structure, one image forming unit 11 will be described in the specification. Since the four toner containers 13 have almost the same structure, one toner container 13 will be described in the specification.

The intermediate transfer belt 10 is provided below the discharge tray 4, and the four image forming units 11 are arranged side by side along the front-and-rear direction below the intermediate transfer belt 10. The exposing unit 12 is provided below the image forming units 11. The four toner containers 13 contain toner (developer) of four colors (yellow, magenta, cyan, and black), and are detachably attached inside the apparatus main body 2. The four toner containers 13 are arranged in a row in the front-and-rear direction along the right side surface of the apparatus main body 2 (see FIG. 3). As will be described in detail later, the apparatus main body 2 has an openable/closable cover 14 on the right side surface, and the toner containers 13 are exposed by opening the cover 14 (see FIG. 3).

The image forming unit 11 includes a photosensitive drum 20, a charging device 21, a developing device 22, a primary transfer roller 23, a cleaning device 24, and an electrostatic eliminator 25. The photosensitive drum 20 as one example of the image carrier is driven to be rotated while in contact with the intermediate transfer belt 10. The charging device 21, the developing device 22, the primary transfer roller 23, the cleaning device 24, and the electrostatic eliminator 25 are arranged around the photosensitive drum 20 in the order of the image forming process. The primary transfer roller 23 faces the photosensitive drum 20 across the intermediate transfer belt 10. A secondary transfer roller 26 is in contact with the rear side portion of the intermediate transfer belt 10.

The image forming apparatus 1 forms an image on the sheet S based on image data outputted from an external terminal (personal computer, or the like), for example. A control part (not shown) provided in the image forming apparatus 1 controls the image forming apparatus 1 based on the input image data, and the image forming process is executed as follows.

The charging device 21 charges the surface of the photosensitive drum 20. The exposing unit 12 exposes the photosensitive drum 20 based on the image data to form an electrostatic latent image on the surface of the photosensitive drum 20. The developing device 22 develops the electrostatic latent image formed on the photosensitive drum 20 into a toner image by using the toner supplied from the toner container 13. The four color toner images carried on the four photosensitive drums 20 are sequentially primary transferred to the intermediate transfer belt 10 by the primary transfer rollers 23 to which a primary transfer bias is applied. Thus, a full-color toner image is formed on the surface of the intermediate transfer belt 10.

The sheet S is fed from the sheet feeding cassette 3 to the conveyance path 8 by the sheet feeding device 5, and the toner image carried on the intermediate transfer belt 10 is secondarily transferred to the sheet S by the secondary transfer roller 26 to which a secondary transfer bias is applied. The toner image is thermally fixed to the sheet S by the fixing device 7, and then the sheet S is discharged to the discharge tray 4. The cleaning device 24 removes the toner remaining on the surface of the photosensitive drum 20, and the electrostatic eliminator 25 removes the charge remaining on the photosensitive drum 20.

Figure 3:
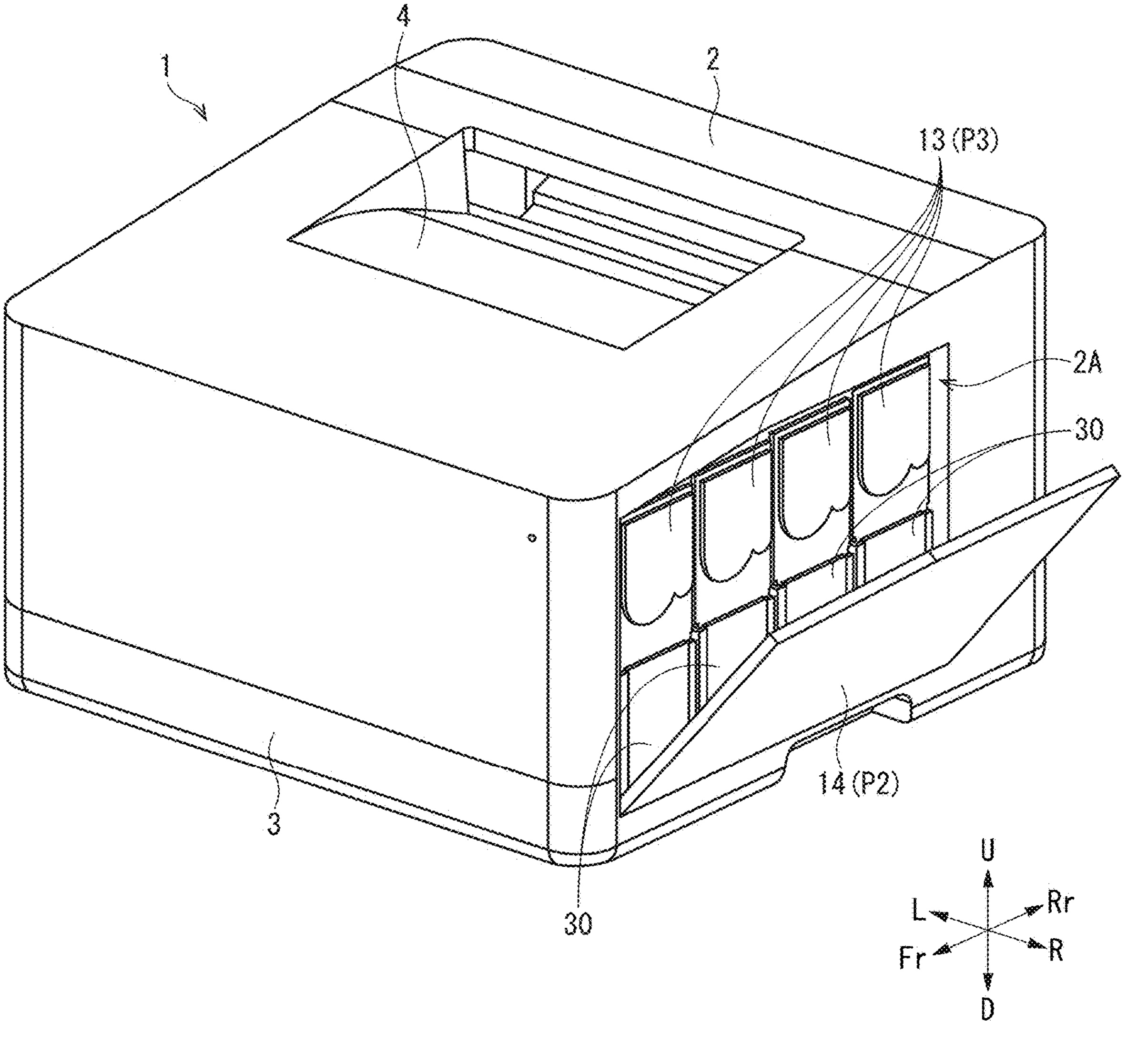
FIG. 3 is a perspective view showing the image forming apparatus according to the embodiment of the present invention, in which a cover is arranged in an open position and a toner container is arranged in an attachment position.
Figure 4:
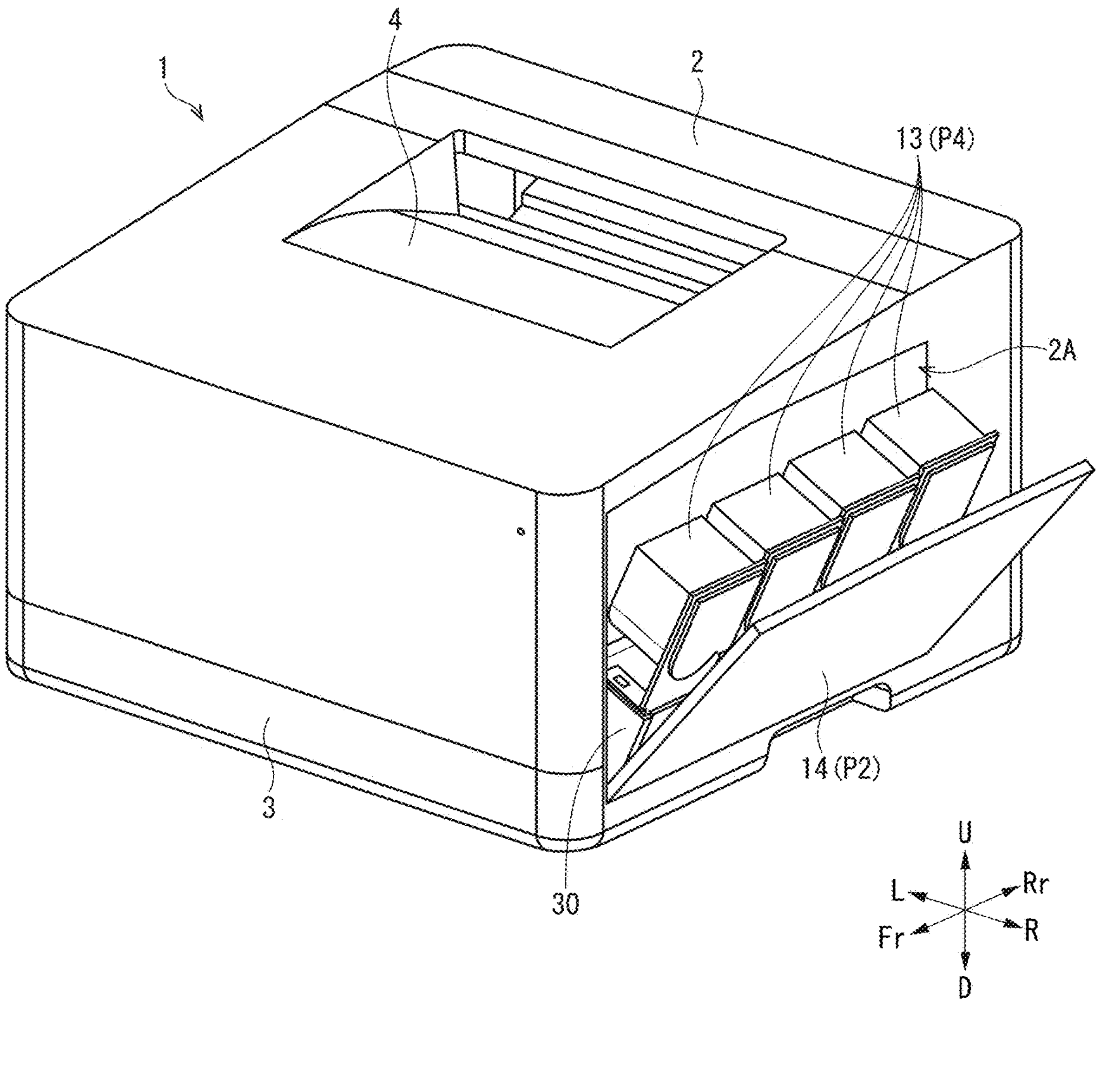
FIG. 4 is a perspective view showing the image forming apparatus according to the embodiment of the present invention, in which the cover is arranged in the open position and the toner container is arranged in a detachment position.
Figure 5:
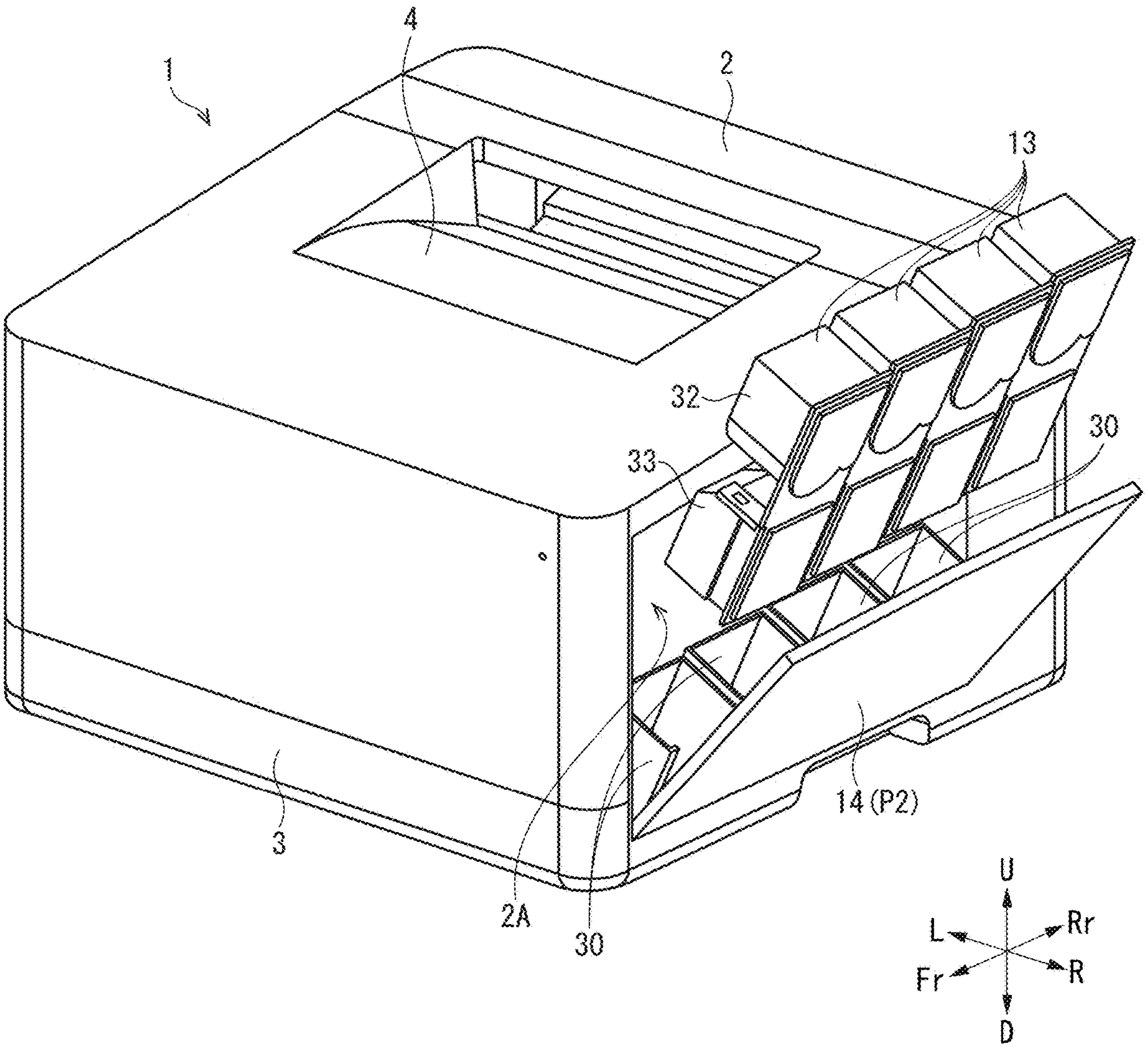
FIG. 5 is a perspective view showing the image forming apparatus according to the embodiment of the present invention, in which the cover is arranged in the open position and the toner container is detached from an apparatus main body.
Figure 6:
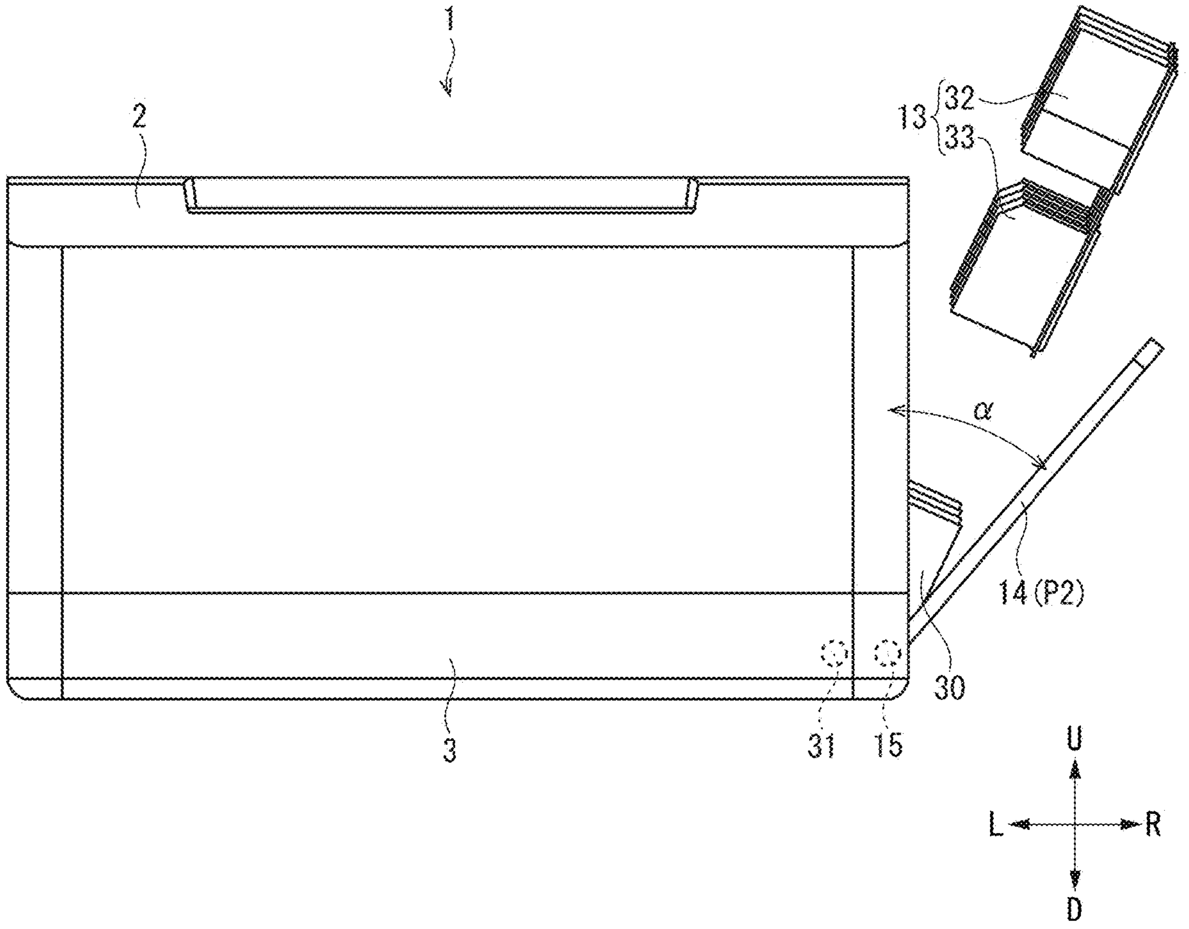
FIG. 6 is a front view showing the image forming apparatus according to the embodiment of the present invention, in which the cover is arranged in the open position and the toner container is detached from the apparatus main body.
Figure 7:
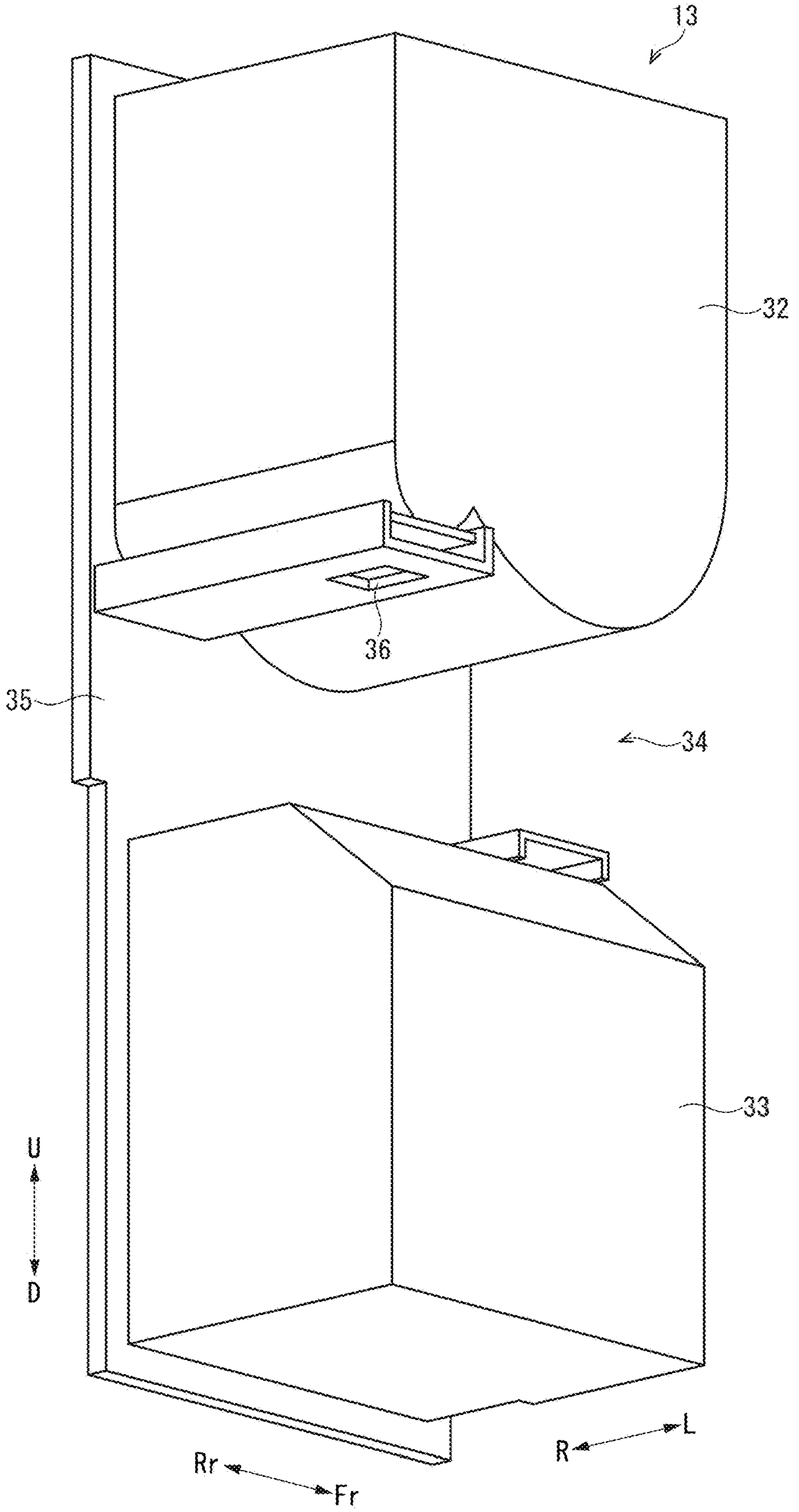
FIG. 7 is a perspective view showing the toner container (replenishment port) of the image forming apparatus according to the embodiment of the present invention.
Figure 8:
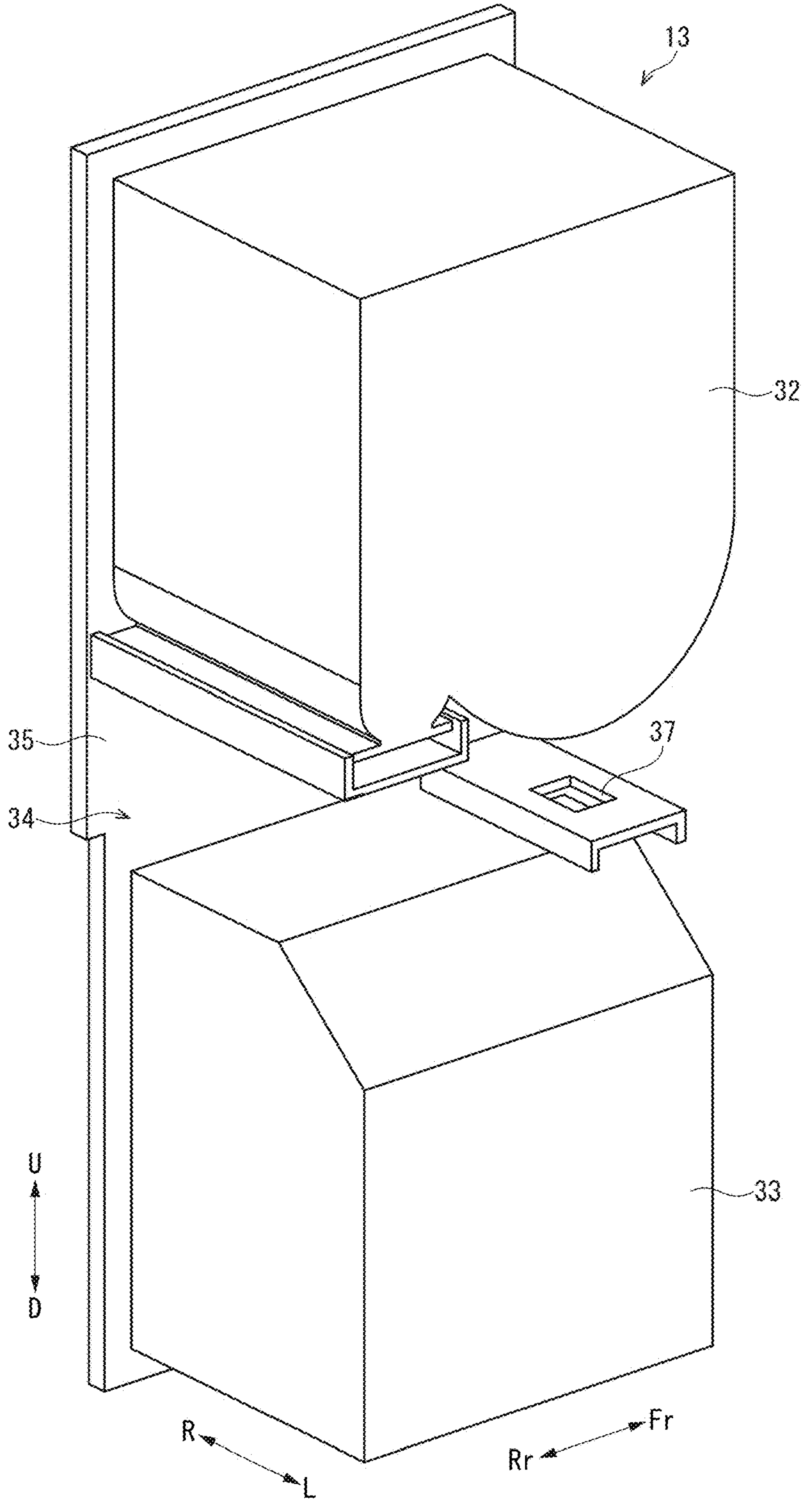
FIG. 8 is a perspective view showing the toner container (recovery port) of the image forming apparatus according to the embodiment of the present invention.
Figure 9:
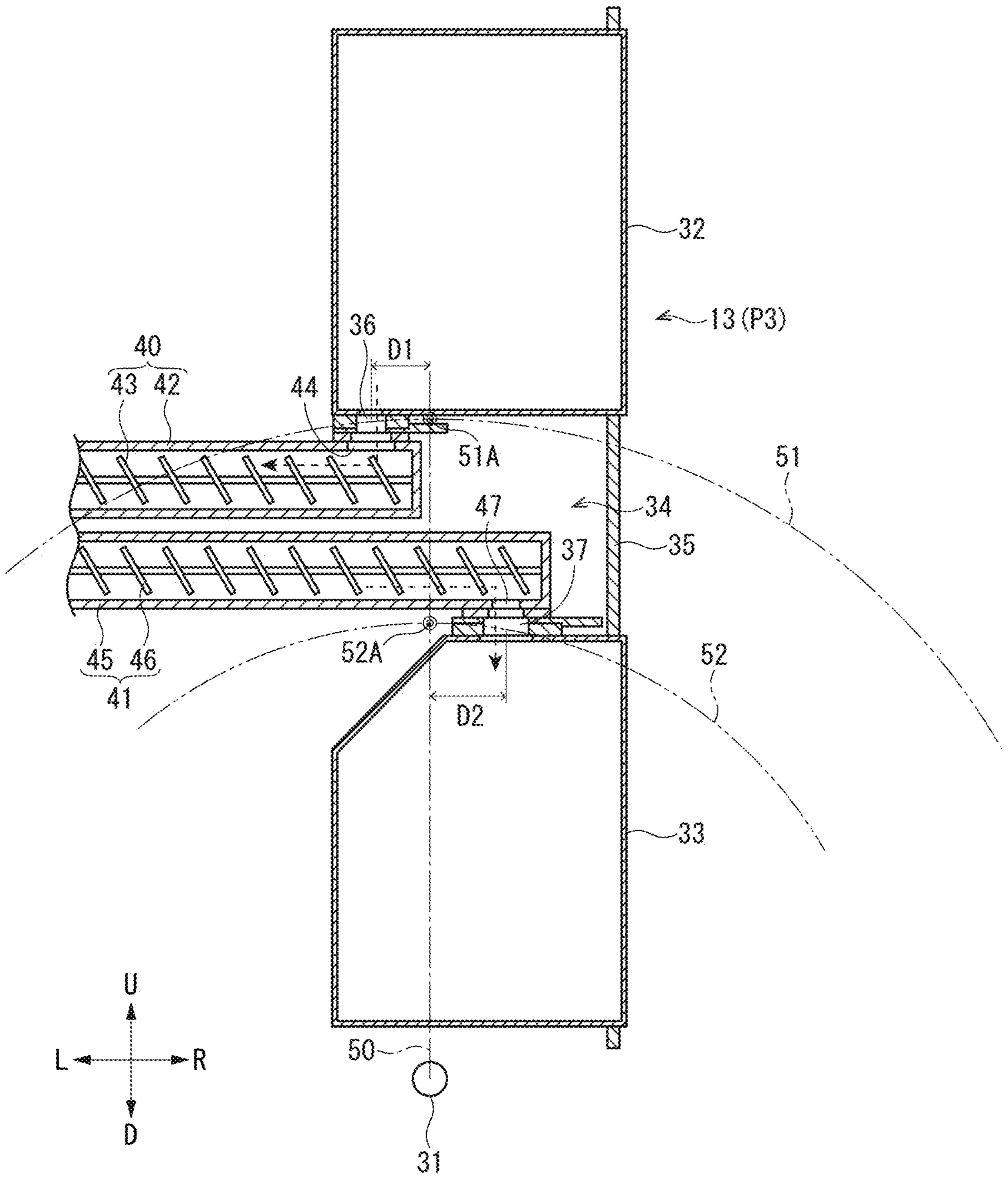
FIG. 9 is a cross-sectional view showing the toner container arranged at the attachment position in the image forming apparatus according to the embodiment of the present invention.

[Toner Container attaching/Detaching Structure] Next, an attaching/detaching structure of the toner container 13 will be described in detail with reference to FIG. 1, FIG. 3, and FIG. 9. FIG. 3 is a perspective view showing a state in which the cover 14 is arranged in an open position P2 and the toner container 13 is arranged in an attachment position P3. FIG. 4 is a perspective view showing a state in which the cover 14 is arranged in the open position P2 and the toner container 13 is arranged in a detachment position P4. FIG. 5 is a perspective view showing a state in which the cover 14 is arranged in the open position P2 and the toner container 13 is detached from the apparatus main body 2. FIG. 6 is a front view showing a state in which the cover 14 is arranged in the open position P2 and the toner container 13 is detached from the apparatus main body 2. FIG. 7 is a perspective view showing the toner container 13 (replenishment port 36). FIG. 8 is a perspective view showing the toner container 13 (recovery port 37). FIG. 9 is a cross-sectional view showing the toner container 13 arranged at the attachment position P3.

<Cover> As shown in FIG. 3, the four toner containers 13 are attached to the right side surface of the apparatus main body 2, and the toner containers 13 can be replaced (detached) by opening the cover 14 provided on the right side surface of the apparatus main body 2. The cover 14 is formed in a substantially flat plate shape, and is provided rotatably around the lower portion. For example, a support shaft 15 (see FIG. 6) extending in the front-and-rear direction is provided at the lower portion of the cover 14, and the cover 14 is rotatably supported by the apparatus main body 2 via the support shaft 15. The cover 14 is turned in a reciprocating manner between a close position P1 standing along the right side surface of the apparatus main body 2 (see FIG. 1) and an open position P2 inclined toward the outside (right side) of the apparatus main body 2 (see FIG. 3, or the others) around the lower portion (the support shaft 15). The cover 14 arranged at the open position P2 is inclined rightward (outside the apparatus main body 2) from the lower end toward the upper end. An angle $\alpha$ (see FIG. 6) formed between the cover 14 arranged at the open position P2 and the right side surface of the apparatus main body 2 is an acute angle (for example, about 40 degrees).

Between the apparatus main body 2 and the cover 14, for example, a strap for holding the cover 14 at the open position P2 (maintaining the angle) is provided (not shown). The strap is folded when the cover 14 is arranged at the close position P1 and unfolded when the cover 14 is arranged at the open position P2 (not shown). An angle $\alpha$ of the cover 14 arranged at the open position P2 may be set within a range of, for example, 30 to 60 degrees.

<Attachment Case> As shown in FIG. 3 to FIG. 5, an attachment space 2A in which the four toner containers 13 are housed is formed on the right side surface of the apparatus main body 2, and is opened by turning the cover 14 to the open position P2. In the attachment space 2A, four attachment cases 30 which support the four toner containers 13 are arranged in a row in the front-and-rear direction. Each attachment case 30 is formed in a substantially square cylindrical shape with an upper surface and a right surface (surface facing the cover 14) open. For example, a turning shaft 31 (see FIG. 6) extending in the front-and-rear direction is provided in the lower portion of each attachment case 30, and each attachment case 30 is turnably supported by the apparatus main body 2 via the turning shaft 31. Since the four attachment cases 30 have substantially the same structure, one attachment case 30 will be mainly described herein.

<Toner Container> As shown in FIGS. 3 to 5, the toner container 13 is generally formed in a substantially rectangular parallelepiped shape elongated in the upper-and-lower direction. The toner container 13 is turnably supported by the apparatus main body 2 together with the attachment case 30 by inserting its substantially lower half into the attachment case 30. The toner container 13 is turned in a reciprocating manner between an attachment position P3 standing inside the apparatus main body 2 (see FIG. 3) and a detachment position P4 inclined to the outside of the apparatus main body 2 (see FIG. 4) (rightward) around the lower portion (the turning shaft 31). The toner container 13 arranged at the detachment position P4 is inclined rightward (to the outside of the apparatus main body 2) from the lower end toward the upper end along the cover 14 arranged in the open position P2. An angle β (see FIG. 10) formed between the toner container 13 (a line parallel to the center line) arranged at the detachment position P4 and the right side surface of the apparatus main body 2 (a vertical imaginary line 50 described later) is an acute angle, but is smaller than the angle α of the cover 14 (for example, about 25 degrees).

A strap (not shown) for holding (maintaining an angle) the toner container 13 supported by the attachment case 30 at the detachment position P4 is provided between the apparatus main body 2 (the inner surface constituting the attachment space 2A) and the attachment case 30. The strap is folded when the toner container 13 is arranged at the attachment position P3, and unfolded when the toner container 13 is attached at the detachment position P4 (not shown). An angle β of the toner container 13 arranged at the detachment position P4 may be substantially the same as the angle α of the cover 14, for example. The angle β of the toner container 13 may be set within a range of, for example, 20 to 60 degrees.

As shown in FIG. 7 and FIG. 8, the toner container 13 has a replenishment vessel 32 and a recovery vessel 33 arranged in a row in the upper-and-lower direction. The recovery vessel 33 is provided below the replenishment vessel 32 across a connection space 34. A container plate 35 is connected near the right end portions of the replenishment vessel 32 and the recovery vessel 33. The replenishment vessel 32 is formed in a hollow substantially rectangular parallelepiped shape, and contains the toner to be replenished. The recovery vessel 33 is formed in a hollow polyhedron shape with the upper left corner inclined, and contains the toner to be disposed. Incidentally, a stirring member for stirring the toner is rotatably provided inside the replenishment vessel 32 (not shown).

(Replenishment Path part, Recovery Path part) As shown in FIG. 9, a replenishment path part 40 for replenishing the toner from the replenishment vessel 32 to the developing device 22 and a recovery path part 41 for recovering the toner from the cleaning device 24 to the recovery vessel 33 are provided inside the apparatus main body 2. In this specification, for convenience of explanation, the toner contained in the replenishment vessel 32 and replenished to the developing device 22 is referred to as “the replenishment toner”, and the toner sent from the cleaning device 24 and contained in the recovery vessel 33 is referred to as “the waste toner”.

The replenishment path part 40 includes a replenishment pipe 42 and a replenishment screw 43, and the recovery path part 41 includes a recovery pipe 45 and a recovery screw 46. In a state where the toner container 13 is arranged at the attachment position P3, the replenishment pipe 42 is provided between the developing device 22 and the replenishment vessel 32, and the recovery pipe 45 is provided between the cleaning device 24 and the recovery vessel 33. The replenishment screw 43 rotates around an axis within the replenishment pipe 42, and conveys the replenishment toner from the replenishment vessel 32 toward the developing device 22. The recovery screw 46 rotates around an axis in the recovery pipe 45, and conveys the waste toner from the cleaning device 24 toward the replenishment vessel 32.

A part of the replenishment path part 40 and the recovery path part 41 is arranged in the connection space 34. More specifically, an upstream side portion of the replenishment pipe 42 in the conveyance direction of the replenishment toner and a downstream side portion of the recovery pipe 45 on the downstream side in the conveyance direction of the waste toner are arranged in the connection space 34. In the connection space 34, a replenishment path port 44 is formed on the upper surface of the replenishment pipe 42, and a recovery path port 47 is formed on the lower surface of the recovery pipe 45. That is, the replenishment path port 44 is opened upward, and the recovery path port 47 is opened downward. In the connection space 34, the replenishment path part 40 and the recovery path part 41 are displaced from each other in the upper-and-lower direction, the left-and-right direction, and the front-and-rear direction (the axial direction of the turning shaft 31). More specifically, the replenishment pipe 42 is arranged above, on the rear side, and on the left side of the recovery pipe 45, and the replenishment path port 44 is formed above, on the rear side, and on the left side of the recovery path port 47.

(Replenishment Port, Recovery port) As shown in FIG. 7 to FIG. 9, a replenishment port 36 is formed on the rear portion of the lower surface of the replenishment vessel 32, and a recovery port 37 is formed on the front portion of the upper surface of the recovery vessel 33. That is, the replenishment port 36 is opened downward, and the recovery port 37 is opened upward. In the connection space 34, the replenishment port 36 and the recovery port 37 are displaced from each other in the upper-and-lower direction, the left-and-right direction, and the front-and-rear direction (the axial direction of the turning shaft 31). More specifically, the replenishment port 36 is disposed above, on the rear side, and on the left side of the recovery port 37. As shown in FIG. 9, in a state where the toner container 13 is arranged at the attachment position P3, the replenishment port 36 is connected to the replenishment path port 44 on the upper surface of the replenishment path part 40 in the connection space 34, and the replenishment toner flows out from the replenishment vessel 32 to the replenishment path part 40. The recovery port 37 is connected to the recovery path port 47 on the lower surface of the recovery path part 41 in the connection space 34, and the waste toner flows from the recovery path part 41 into the recovery vessel 33. The replenishment vessel 32, the recovery vessel 33, the replenishment path part 40, and the recovery path part 41 has shutters (not shown) that close the replenishment port 36, the recovery port 37, the replenishment path port 44, and the recovery path port 47 when the toner container 13 is detached from the apparatus main body 2.

As shown in FIG. 9, the replenishment port 36 and the recovery port 37 are displaced from each other in the left-and-right direction across a vertical imaginary line 50 extending vertically through the turning shaft 31 (its axial center) of the toner container 13. The replenishment port 36 is arranged on the inner side (left side) of the apparatus main body 2 from the vertical imaginary line 50, and the recovery port 37 is arranged on the outer side (right side) of the apparatus main body 2 from the vertical imaginary line 50. Specifically, the vertical imaginary line 50 is positioned slightly close to the replenishment port 36 (on the left side) from the meddle between the replenishment port 36 and the recovery port 37, and an interval D1 between the vertical imaginary line 50 and the center of the opening of the replenishment port 36 is slightly shorter than an interval D2 between the vertical imaginary line 50 and the center of the opening of the recovery port 37. The interval D1 may be the same as the interval D2 or may be longer than the interval D2 (not shown).

Figure 10:
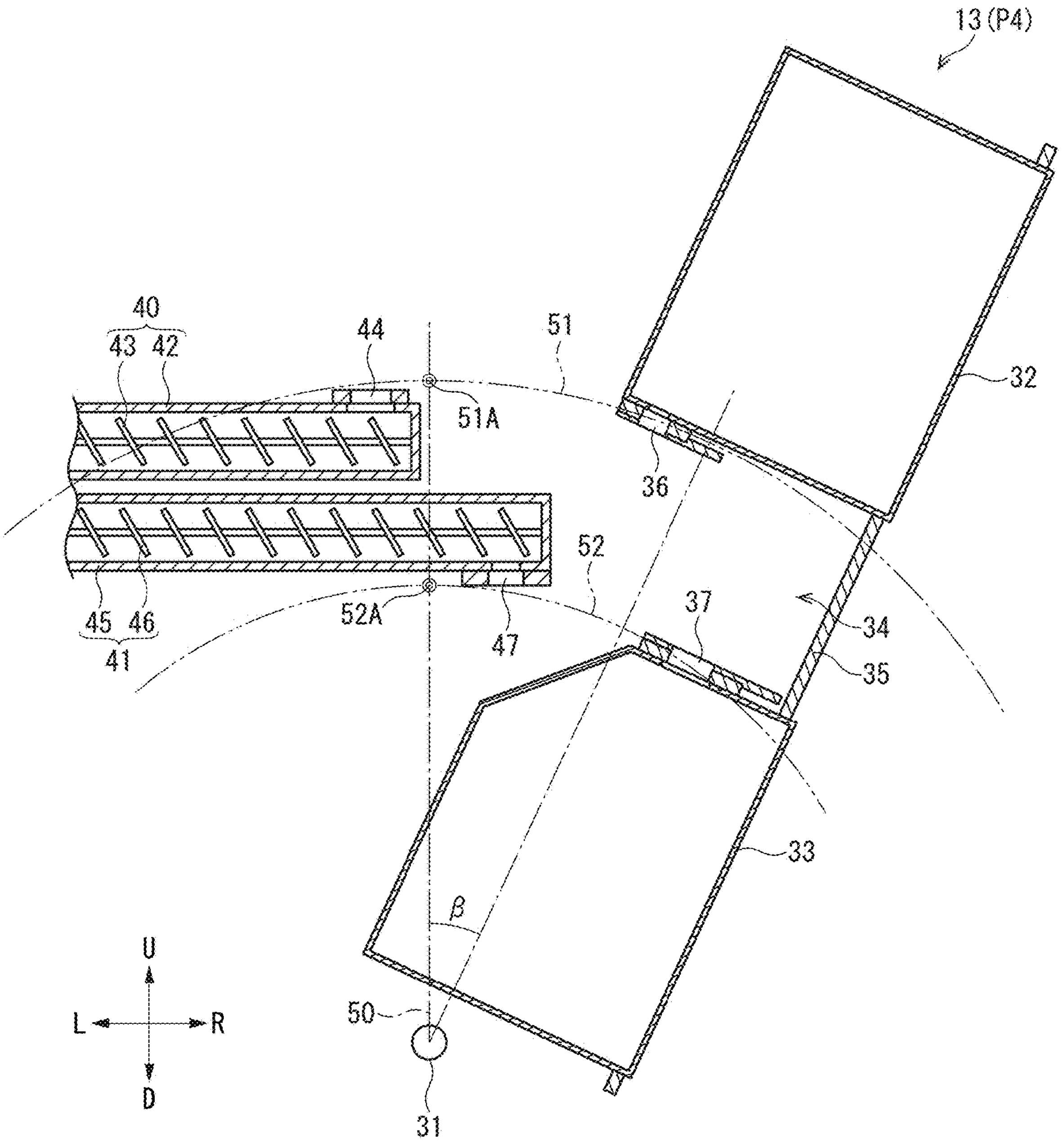
FIG. 10 is a cross-sectional view showing the toner container arranged at the detachment position in the image forming apparatus according to the embodiment of the present invention.

[Replacement of Toner Container] With reference to FIG. 3 to FIG. 6, FIG. 9, and FIG. 10, an operation of replacing (attaching and detaching) the toner container 13 will be described. FIG. 10 is a cross-sectional view showing the toner container 13 arranged at the detachment position P4. In this specification, for convenience of explanation, the direction in which the toner container 13 moves from the attachment position P3 to the detachment position P4 (clockwise direction in FIG. 9 and FIG. 10) is referred to as "the attachment turning direction", and the direction in which the toner container 13 moves from the detachment position P4 to the attachment position P3 (counterclockwise direction in FIG. 9 and FIG. 10) is referred to as "the detachment turning direction".

For example, when replacing the toner container 13 because the replenishment vessel 32 becomes empty, the user turns the cover 14 of the apparatus main body 2 from the close position P1 to the open position P2 (see FIG. 3), and then turns the toner container 13 from the attachment position P3 to the detachment position P4 (see FIG. 4).

Here, as shown in FIG. 9 and FIG. 10, when the toner container 13 turns from the attachment position P3 to the detachment position P4, the replenishment port 36 of the replenishment vessel 32 moves on a circular orbit 51 around the turning shaft 31, and the recovery port 37 of the recovery vessel 33 moves on a circular orbit 52 around the turning shaft 31. The circular orbits 51, 52 and the vertical imaginary line 50 are intersected at apexes 51A, 52A of the circular orbits 51, 52. As shown in FIG. 9, in the state where the toner container 13 is arranged at the attachment position P3, the replenishment port 36 is arranged on the upper side of the replenishment path port 44 and on the inner side (left side) of the apparatus main body 2 from the vertical imaginary line 50, and the recovery port 37 is arranged on the lower side of the recovery path port 47 and on the outer side (right side) of the apparatus main body 2 from the vertical imaginary line 50. In other words, the replenishment port 36 is arranged on the upstream side of the apex 51A of the circular orbit 51 in the detachment turning direction, and the recovery port 37 is arranged on the downstream side of the apex 52A of the circular orbit 52 in the detachment turning direction.

Accordingly, when the toner container 13 is turned in the detachment turning direction (clockwise direction in FIG. 9), the replenishment port 36 moves on the circular orbit 51 toward the apex 51A, and is separated obliquely upward from the replenishment path port 44. And, the recovery port 37 move on the circular orbit 52 far from the apex 52A, and is separated obliquely downward from the recovery path port 47. As described above, when the toner container 13 is turned in the detachment turning direction, interference of the replenishment port 36 with the replenishment path part 40 and interference of the recovery port 37 with the recovery path part 41 are prevented. Since the upper left corner of the recovery vessel 33 is inclined, the recovery vessel 33 is prevented from interfering with the recovery path part 41 when the toner container 13 is turned in the detachment turning direction.

As shown in FIG. 4, when the cover 14 is arranged at the open position P2 and the toner container 13 is arranged at the detachment position P4, the cover 14 and the toner container 13 are held in an inclined posture. As shown in FIG. 5 and FIG. 6, the user pulls out the toner container 13 diagonally upward and rightward along the cover 14 arranged at the open position P2. The toner container 13 is pulled out of the attachment case 30 and detached from the apparatus main body 2.

Next, the user inserts the new toner container 13 diagonally downward and leftward along the cover 14 arranged at the open position P2 (see FIGS. 5 and 6). The new toner container 13 is inserted into the attachment case 30 in an inclined posture (see FIG. 4). Subsequently, the user turns the toner container 13 from the detachment position P4 to the attachment position P3 (see FIG. 3), and then turns the cover 14 from the open position P2 to the close position P1 (see FIG. 1).

When the toner container 13 is turned from the detachment position P4 to the attachment position P3 (turned in the attachment turning direction), the replenishment port 36 moves to the apex 51A of the circular orbit 51 and is close to (in contact with) the replenishment path port 44 from obliquely above, and the recovery port 37 is close to (in contact with) the recovery path port 47 from obliquely below (see FIG. 9 and FIG. 10), which are opposite moving of the toner container 13 in the detachment turning direction described above. As described above, when the toner container 13 is turned in the attachment turning direction (counterclockwise direction in FIG. 9 and FIG. 10), interference of the replenishment opening 36 with the replenishment path part 40 and interference of the recovery port 37 with the recovery path part 41 are prevented. Since the upper left corner portion of the recovery vessel 33 is inclined, the recovery vessel 33 is prevented from interfering with the recovery path part 41 when the toner container 13 is turned in the attachment turning direction.

When the toner container 13 is arranged at the attachment position P3 and the cover 14 is arranged at the close position P1, the cover 14 and the toner container 13 are held in the standing position (see FIG. 1 and FIG. 3). Thus, the toner container 13 is attached to the apparatus main body 2 (attachment space 2A), and the replacement work of the toner container 13 is completed.

In the image forming apparatus 1 according to the present embodiment described above, an angle formed between the cover 14 arranged at the open position P2 and the right side surface of the apparatus main body 2 is acute, and the toner container 13 arranged at the detachment position P4 is detachable obliquely along the cover 14 arranged at the open position P2 (see FIG. 5 and FIG. 6). According to this configuration, a space required for opening and closing the cover 14 can be reduced compared with the case where the cover 14 is opened 90 degrees or more with respect to the right side surface of the apparatus main body 2. Thus, the image forming apparatus 1 can be installed even in a place where the open space of the cover 14 cannot be widely secured such as a narrow office. That is, the restriction required for the installation of the image forming apparatus 1 can be relaxed, and the degree of freedom of the installation location of the image forming apparatus 1 can be improved.

Further, in the image forming apparatus 1 according to the present embodiment, the replenishment port 36 opened downward is connected to the replenishment path port 44 opened upward from the upper side, and is located on the upstream side of the apex 51A of the circular orbit 51 in the detachment turning direction (see FIG. 9). Further, the recovery port 37 opened upward is connected to the recovery path port 47 opened downward from the lower side, and is located on the downstream side of the apex 52A of the circular orbit 52 in the detachment turning direction (see FIG. 9). Accordingly, when the toner container 13 is turned from the attachment position P3 to the detachment position P4, the replenishment port 36 is separated from the replenishment path port 44 (the replenishment path part 40) obliquely upward, and the recovery port 37 is separated from the recovery path port 47 (the recovery path part 41) obliquely downward (see FIG. 9 and FIG. 10). On the other hand, when the toner container 13 is turned from the detachment position P4 to the attachment position P3, the replenishment port 36 is connected to the replenishment path port 44 (replenishment path part 40) from an upward oblique direction, and the recovery port 37 is connected to the recovery path port 47 (recovery path part 41) from a downward oblique direction (see FIG. 9 and FIG. 10). According to this configuration, the replenishment port 36 and the recovery port 37 do not interfere with the replenishment path part 40 and the recovery path part 41 so that the turning of the toner container 13 is nor prevented, and the toner container 13 can be smoothly turned. Thus, for example, the toner container 13, in which the replenishment vessel 32 and the recovery vessel 33 are arranged in the upper-and-lower direction, can be smoothly attached to and detached from the apparatus main body 2 (attachment space 2A) without providing special mechanisms for preventing mutual interference in the replenishment port 36 and the replenishment path part 40.

In the image forming apparatus 1 according to the present embodiment, the replenishment path part 40 and the recovery path part 41 are disposed in the connection space 34 of the toner container 13, and the replenishment port 36 and the recovery port 37 are connected to the replenishment path part 40 and the recovery path part 41 in the connection space 34 (see FIG. 9). According to this configuration, since the connection structure of the toner container 13 and the respective path parts 40, 41 can be concentrated near the center of the toner container 13, the image forming apparatus 1 (apparatus main body 2) can be miniaturized.

In the image forming apparatus 1 according to the present embodiment, the replenishment vessel 32 is arranged above the recovery vessel 33 across the connection space 34, and the replenishment port 36 is arranged above the recovery port 37 in the connection space 34 (see FIG. 7 and FIG. 8). According to this configuration, the replenishment port 36 can be formed on the lower surface of the replenishment vessel 32, and the recovery port 37 can be formed on the upper surface of the recovery vessel 33, so that the connection space 34 can be made low (small). Thus, a height of the toner container 13 can be reduced, and a size of the apparatus main body 2 to which the toner container 13 is attached can be reduced.

In the image forming apparatus 1 according to the present embodiment, the replenishment port 36 and the recovery port 37 are displaced from each other in the upper-and-lower direction and the front-and-rear direction (axial direction) in the connection space 34 of the toner container 13, and the replenishment path part 40 and the recovery path part 41 are therefore displaced from each other in the upper-and-lower direction and in the front-and-rear direction, but the present disclosure is not limited thereto. For example, the replenishment path part 40 and the recovery path part 41 may be arranged side by side in the front-and-rear direction at the same height (not shown). In this case, the replenishment port 36 (replenishment path port 44) is arranged above the recovery port 37 (recovery path port 47). According to the above configuration, a height of the connection space 34 can be minimized, and a height of the toner container 13 can be reduced. Thus, the image forming apparatus 1 (apparatus main body 2) can be compactly formed.

Figure 11:
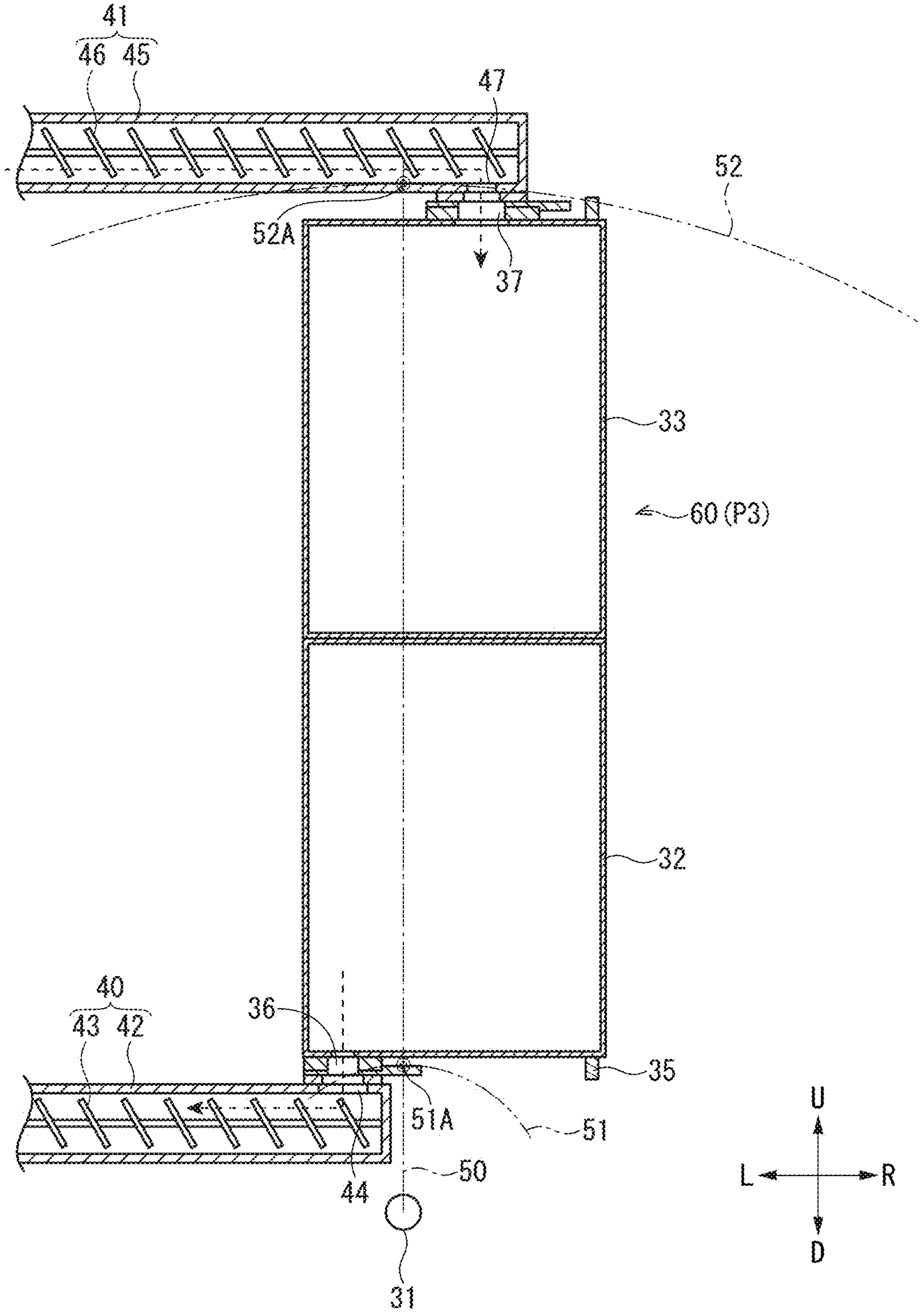
FIG. 11 is a cross-sectional view showing the toner container arranged at the attachment position, in the image forming apparatus according to a first modified example of the embodiment of the present invention.

In the image forming apparatus 1 according to the present embodiment, the replenishment vessel 32 of the toner container 13 is provided above the recovery vessel 33, but the present disclosure is not limited thereto. For example, as the toner container 60 according to a first modified example, as shown in FIG. 11, the recovery vessel 33 may be provided above the replenishment vessel 32. In this case, the replenishment path part 40 is arranged below the toner container 60, and the recovery path part 41 is arranged above the toner container 60. The connection space 34 may be omitted.

Figure 12:
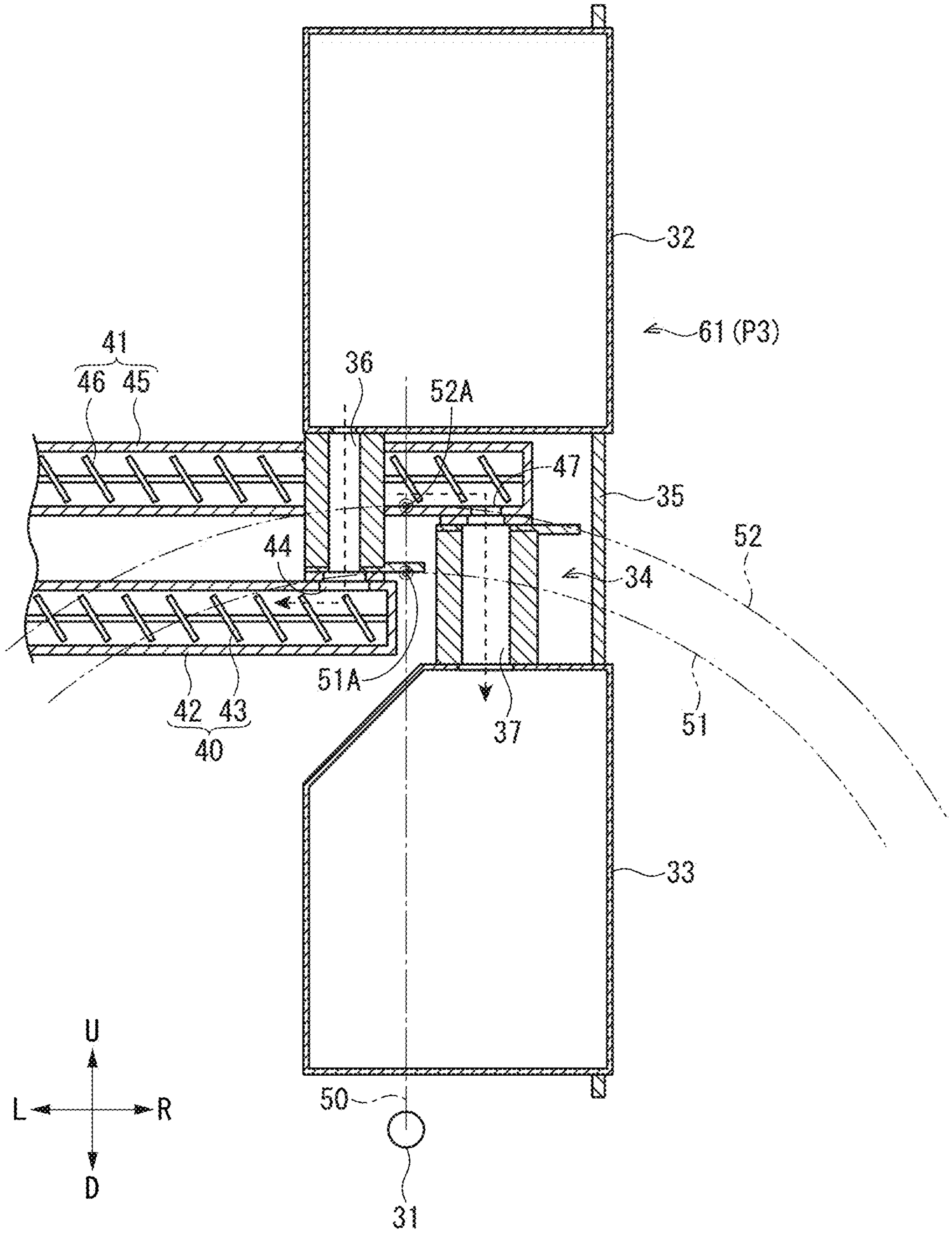
FIG. 12 is a cross-sectional view showing the toner container arranged at the attachment position, in the image forming apparatus according to a second modified example of the embodiment of the present invention.

In the image forming apparatus 1 according to the present embodiment, the replenishment port 36 of the toner container 13 is arranged above and on the rear side of the recovery port 37, but the present disclosure is not limited thereto. For example, in the toner container 61 according to a second modified example, as shown in FIG. 12, the replenishment port 36 may be formed as a pipeline extending downward from the lower surface of the replenishment vessel 32, and the recovery port 37 may be formed as a pipeline extending upward from the upper surface of the recovery vessel 33. The lower end surface of the replenishment port 36 may be arranged below the upper end surface of the recovery port 37. The replenishment path part 40 (replenishment path port 44) and the recovery path part 41 (recovery path port 47) may be arranged in accordance with the replenishment port 36 and the recovery port 37. Alternatively, the replenishment port 36 (replenishment path port 44) may be arranged so as to overlap (at the same position in the front-and-rear direction) directly above the recovery port 37 (recovery path port 47) (not shown).

In the image forming apparatus 1 according to the present embodiment, although the turning shaft 31 of the toner containers 13, 60, and 61 (the attachment case 30) is provided at a position different from the support shaft 15 of the cover 14, the turning shaft 31 of the toner containers 13, 60, and 61 may be used as the support shaft 15 of the cover 14 (not shown).

In the image forming apparatus 1 according to the present embodiment, the attachment case 30 is rotatably supported by the apparatus main body 2 (attachment space 2A), and the toner containers 13, 60, and 61 each is supported by the attachment case 30, but the present disclosure is not limited thereto. For example, the attachment case 30 may be omitted and the turning shaft 31 may be provided directly in the lower portion of each of the toner containers 13, 60, and 61 (not shown). In this case, the turning shaft 31 may be detachably supported by a bearing (not shown) provided in the apparatus main body 2 (attachment space 2A). Alternatively, the turning shaft 31 may be fixed to the apparatus main body 2, and a bearing detachably engaged with the turning shaft 31 may be provided in the lower portion of each of the toner containers 13, 60, and 61 (not shown).

In the image forming apparatus 1 according to the present embodiment, the cover 14 is provided on the right side surface of the apparatus main body 2, but the cover 14 is not limited thereto, and may be provided on the left side surface of the apparatus main body 2, or may be provided on the front side surface or the rear side surface of the apparatus main body 2 (neither of which is shown). That is, the toner containers 13, 60, and 61 (the attachment space 2A) may be arranged on the left side, front side, or rear side of the apparatus main body 2 (not shown).

Further, in the description of the present embodiment, as an example, a case in which the present disclosure is applied to the image forming apparatus 1 (printer) is shown, but the present disclosure is not limited thereto, and the present disclosure may be applied to, for example, a multifunctional peripheral, a copying machine, or a facsimile machine.

The invention claimed is:

1. An image forming apparatus, comprising:

a cover which opens and closes a side surface of an apparatus main body;

a toner container which is detachably attached to an inside of the apparatus main body;

a developing device which develops an electrostatic latent image formed on an image carrier with a toner;

a cleaning device which removes the toner remaining on the image carrier;

a replenishment path part which replenishes the toner from a replenishment vessel to the developing device; and a recovery path part which recoveries the toner from the cleaning device to the recovery vessel, wherein the cover is turned in a reciprocating manner between a close position standing upright along the side surface of the apparatus main body and an open position inclined outside the apparatus main body around a lower portion of the cover such that an angle between the side surface of the apparatus main body and the cover is acute, the toner container includes the replenishment vessel in which the toner to be replenished is contained and a recovery vessel in which the toner to be disposed is contained, the replenishment vessel and the recovery vessel being arranged in an upper-and-lower direction, the toner container is turned in a reciprocating manner between an attachment position standing upright inside the apparatus main body and a detachment position inclined outside the apparatus main body around a lower portion of the toner container so as to be along the cover, and the toner container arranged in the detachment position is detached along the cover arranged at the open position, a replenishment port is formed on a lower surface of the replenishment vessel, which is connected to an upper surface of the replenishment path part so as to send the toner to the replenishment path part, a recovery port is formed on an upper surface of the recovery vessel, which is connected to a lower surface of the recovery path part so as to receive the toner from the recovery path part, the replenishment port is arranged on an inner side of the apparatus main body from a vertical imaginary line extending in an upper-and-lower direction passing a turning shaft of the toner container, and the recovery port is arranged on an outer side of the apparatus main body from the vertical imaginary line.

2. The image forming apparatus according to claim 1, wherein the recovery vessel is arranged below the replenishment vessel across a connection space in which a part of the replenishment path part and a part of the recovery path part are arranged, and the replenishment port is connected to the replenishment path part in the connection space, and the recovery port is connected to the recovery path part in the connection space.

3. The image forming apparatus according to claim 2, wherein the replenishment port is arranged above the recovery port in the connection space.

4. The image forming apparatus according to claim 3, wherein the replenishment port and the recovery port are displaced from each other in an axial direction of the turning shaft, and the replenishment path part and the recovery path part are displaced from each other in the axial direction according to the replenishment port and the recovery port.

* * * * *